United States Patent Office 3,262,752
Patented July 26, 1966

3,262,752
PROCESS FOR MAKING MANGANOUS CARBONATE
William G. Moore, Midland, Mich., and William E. Domning, Arvado, Colo., assignors to The Dow Chemical Company, Midland, Mich., a corporation of Delaware
No Drawing. Filed June 12, 1963, Ser. No. 287,192
6 Claims. (Cl. 23—61)

The invention relates to an improved method of making manganous carbonate of improved physical properties and of high purity.

Manganous carbonate having the chemical formula, $MnCO_3$, is an important industrial chemical. Among its uses is that of making $MnO_2$ which may be accomplished by merely heating the $MnCO_3$ in the presence of excess oxygen gas, e.g., air.

One of the principal uses of $MnO_2$ is in the manufacture of the type of galvanic cells known generally as "dry cells" wherein the electrolyte consists of an aqueous paste of an electrolytic salt, e.g., $NH_4Cl$, and a depolarizer intermixed therewith, the preferred material therefor being $MnO_2$.

Presently known methods of making $MnCO_3$ have produced a material having a bulk density which is not satisfactory for a large number of uses among which is that of making $MnO_2$. $MnCO_3$, made according to a known method, e.g., by merely admixing aqueous solutions of $Na_2CO_3$ with a manganous salt, e.g., $MnCl_2$, to produce $MnCO_3$ as a precipitate, and separating the precipitate, has a bulk density usually not greater than about 10 grams (and frequently lower) per cubic inch. It is desirable that $MnCO_3$ have a bulk density of at least about 15 grams and preferably at least about 20 grams per cubic inch. (It is customary in the trade to state the density of this type of product in grams per cubic inch, i.e., metric weight units per English volume unit.)

The principal object of the invention is to provide a method of making $MnCO_3$ having the above designated desired density. The manner of carrying out the invention to attain this and related objects is made clear in the ensuing description and is succinctly defined in the appended claims.

The invention, accordingly, in a broad sense, is the method of preparing high density $MnCO_3$ by an improved and heretofore unknown process which comprises admixing aqueous solutions of a water-soluble manganous salt with a water-soluble carbonate in relative proportions of each to provide and maintain a molar excess of the Mn fraction of the manganous salt over the $CO_3$ fraction of the soluble carbonate therein, at a pH value of between about 5.7 and about 7.2, under stirred conditions, at a temperature of between about 55° C. and the boiling temperature of the admixture, to produce $MnCO_3$ in suspension to make a slurry; maintaining the $MnCO_3$ in suspension until the particle size and the concentration of the suspended $MnCO_3$ in the slurry are such as to insure a bulk density of the $MnCO_3$ of at least 15 grams per cubic inch, and preferably at least about 20 grams per cubic inch; and separating the $MnCO_3$ so produced.

The bulk density of the $MnCO_3$ product may be determined by one of several procedures, two of which are set out in detail hereinafter.

The conditions requiring a molar excess of Mn over $CO_3$, i.e., a molar ratio of Mn to $CO_3$ of more than 1, and the specified temperature requiring a temperature not lower than about 55° C. are critical. When these conditions are not observed, there is an objectionable amount of $Na_2CO_3$ and/or $NaHCO_3$ occluded in the $MnCO_3$ product. The pH limits must also be observed. Since $Na_2CO_3$ raises the pH and $MnCl_2$ lowers it, the pH is easily adjusted by regulating the flow of feed within the required molar ratio. The period required for obtaining proper density $MnCO_3$ is at least about 1.5 hours; usually 3 to 5 hours are employed. The concentration of the aqueous feed solutions are not critical. However, it is recommended that the concentration be at least about 5% by weight and preferably that it approach the saturation point of the solutions at the temperature employed.

A preferred mode of practicing the invention is to admit metered flows of aqueous solutions of $Na_2CO_3$ and $MnCl_2$, of a concentration of say at least about 10% by weight, into a stirred reactor, at a rate to provide more than 1 but not appreciably over about 1.05 moles of Mn per mole of $CO_3$ groups, at a reactor temperature of between about 75° C. and about 95° C. and a pH value of between 6.0 and 6.9, to produce a $MnCO_3$ slurry; periodically obtaining the bulk density of the manganous carbonate being produced in suspension; and when a bulk density of at least about 20 grams per cubic inch has been obtained, providing an overflow of slurry from the reactor and continuing to maintain the feed, temperature, pH value, and overflow to provide an inventory time in the reactor which will continue to produce manganous carbonate of a density of at least about 20 grams per cubic inch.

One satisfactory procedure for ascertaining the bulk density of the $MnCO_3$ being produced is as follows: 1000 milliliters of the aqueous $MnCO_3$ slurry, from the reaction mixture, is put in a 1000-milliliter graduate and allowed to stand therein undisturbed for seven minutes. During this time, the $MnCO_3$ therein settles to the bottom forming (with a small amount of entrapped NaCl-containing mother liquor) the lower of two distinct layers, the upper layer being the major portion of the mother liquor. The volume of the low layer, comprising the $MnCO_3$ and the entrapped mother liquor is then recorded in milliliters and the weight of $MnCO_3$ in the lower layer ascertained by decanting off substantially all the upper layer, filtering, washing, and drying the $MnCO_3$ in the lower layer, and weighing the resulting dried filter cake. The actual weight of $MnCO_3$ thus obtained is both the amount in grams, the lower layer, and the density of the slurry in the reaction vessel in grams per liter.

The ratio of the density of the body of stirred suspension in the reaction vessel in grams per liter to the volume of the $MnCO_3$ and entrapped mother liquor making up the lower layer of the stratified 1000-milliliter sample is then ascertained and is converted to grams per cubic inch by multiplying the density in grams per cubic centimeter by 16.4, the value of $(2.54)^3$, since 1 inch equals about 2.54 centimeters. The resulting answer is substantially the density of the $MnCO_3$ in grams per cubic inch. For example, if the weight of $MnCO_3$ in the lower layer is 60 grams (which is also the density in grams per liter) and the volume of the lower layer of $MnCO_3$ and entrapped mother liquor is 80 milliliters, then the above procedure may be expressed:

$$\frac{60}{80} \times 16.4 \text{ or } 12.3$$

and, therefore, the density of the $MnCO_3$ is about 12 grams per cubic inch.

Since this density would be too low, in practice the soluble manganous salt and soluble carbonate aqueous solutions are continued to be admitted and to be admixed in the reaction vessel, while the reaction conditions are continued to be maintained to yield $MnCO_3$ in suspension within the above-specified conditions. Additional density values of the $MnCO_3$ are obtained periodically until a result is obtained which is satisfactory, e.g., $$\frac{100}{80} \times 16.4 \text{ or } 20.5$$

which represents a very acceptable density of 20 grams per cubic inch for the MnCO₃ product.

A second satisfactory and more convenient way of determining the bulk density of the MnCO₃ made, which may be carried out by visual observations and calculations only, is as follows: a 1000-milliliter sample of the aqueous MnCO₃ slurry is obtained from the reaction mixture and put in a 1000-milliliter graduate, as above. The total weight of the sample is ascertained by: obtaining the crystal density of MnCO₃ from the table of a standard handbook (it being 3.12 grams per cm.³); obtaining the density of the upper stratified mother liquor solution in grams per cm.³ by means of an hydrometer; and measuring the volume of the settled MnCO₃ in the 1000-milliliter graduate by visual observation. The total weight of the sample is then obtained by the equation:

$$W = p_1 X + p_2 Y$$

wherein W is the total weight of MnCO₃ and mother liquor in the 1000-milliliter sample; $p_1$ is the crystal density of MnCO₃; X is the true volume occupied by MnCO₃ in milliliters (not the apparent or visually measurable volume) in the 1000-milliliter sample; $p_2$ is the density of the supernatant mother liquor; and Y is the true volume (not the apparent or visually measurable volume) of mother liquor in milliliters in the sample. The measured volume, i.e., 1000 milliliters of the sample equals the true volume of MnCO₃ and mother liquor.

Therefore, if V represents the volume of the sample, then $V = X + Y$ and Y may be expressed as $V - X$ and the bulk density is obtained as follows:

$$W = p_1 X + p_2 (V - X)$$
$$W = p_1 X + p_2 V - p_2 X$$

and X can be expressed as $$\frac{W - p_2 V}{p_1 - p_2} = X$$

the true volume of MnCO₃.

The bulk density is found by the equation:

$$D = \frac{p_1 X}{V_m}$$

where D is the bulk density of the MnCO₃ in grams per cm.³ and $V_m$ is the measured settled volume of the MnCO₃ in cm.³ in the 1000-milliliter graduate.

Since 1 inch = 2.54 cm., the density in grams per cm.³ can be converted to grams per in.³ by multiplying it by 16.4, i.e. $(2.54)^3$.

When a satisfactory bulk density for the MnCO₃ being made has been obtained, the feed rates and agitation are thereafter held substantially constant and the upper part of the slurry in the reaction vessel caused to overflow, in a continuous manner, into a receiving trough or conduit which preferably carries it to a settling tank. A substantial portion of the mother liquor is removed, usually continuously, from the upper part of the settling tank and the wet slurry from the lower part from which it is conveyed to a filter. The MnCO₃ is washed, removed from the filter, and thereafter dried and (as desired) stored or used.

The following example is illustrative of the practice of the invention:

Example 1

The vessel employed was a 60-gallon glass lined kettle provided with an anchor-type agitator and a recycle pump and return line (which provided circulation from the bottom to the top of the kettle). An enclosing jacket was connected to hot and cold water sources for heating and cooling, as needed. A pH meter was positioned in the recycle line so that the pH value could be ascertained at any time. The kettle was provided with two metered feed line sand an overflow line which were equipped with suitable flow control means. The recycle line was provided with a means for obtaining samples of the reaction mixture.

An aqueous solution of MnCl₂, having a concentration of 187 grams per liter, was admitted through one of the feed lines to the reactor, and simultaneously therewith, an aqueous solution of Na₂CO₃, at a concentration of 104 grams per liter, was admitted through the other feed line. The rate of flow was continuously metered by a rotameter positioned in each feed line. The rate of inflow of the aqueous MnCl₂ solution was 0.737 liter (1.095 gram moles) per minute. The rate of inflow of the aqueous Na₂CO₃ solution was 1.095 liters (1.075 gram moles) per minute; a total inflow rate of 1.832 liters per minute was thus provided.

After a period of 1.5 hours, a settling test of the slurry was taken and the density of the MnCO₃ therein found to be 12.2 grams per cubic inch. At that time, about 30 gallons of the slurry were removed from the kettle, filtered, and the MnCO₃ on the filter returned to the kettle to build up the solids. After 3.15 hours from the start-up, a second settling test was run on the slurry and the density of the MnCO₃ therein found to be 25 grams per cubic inch. The slurry so removed was, as above, filtered, and the MnCO₃ collected in the filter and returned to the kettle to build up further the solids. After 4.5 hours from the start-up, a third settling test was run and the density of the MnCO₃ found to be 27 grams per cubic inch. At that time, another 30 gallons of the slurry were removed from the kettle, the MnCO₃ separated by filtration and returned to the kettle to continue to build up the solids. After a total time of 5.25 hours from the start-up, another settling test was run which showed the density of the MnCO₃ to be 23.0 grams per cubic inch. Provision was then made for overflow from the kettle at the rate of about 29 gallons per hour. The overflow was continuously filtered and the MnCO₃ therefrom retained, washed, and dried. A settling test was run after 9.15 hours (total operating time) and showed the MnCO₃ to have a density of 26 grams per cubic inch.

The run was continued for a total time of 30.1 hours during which 490 pounds of MnCO₃, having an average density of 24.5 grams per cubic inch, were made. The average inventory time of the reactants in the kettle, following the initial 5.15 hours, was 1.2 hours.

During the run of Example 1, MnCO₃ was produced in suspension at the rate of 1.075 moles per minute. This was 123.5 grams per minute, which was 67.4 grams per liter of reaction mixture. NaCl was produced in solution at the rate of 2.15 gram moles per minute. This was 125.8 grams per minute or 68.6 grams per liter. A total of 2.3 grams or 1.28 grams per liter of the Mn portion of the MnCl₂ remained unreacted. This represents an efficiency, in the yield of MnCO₃ based on the weight of MnCl₂, of 98.0%. The pH value was controlled throughout the run at between 6.0 and 6.2. The temperature was controlled throughout the run at between 80° C. and 90° C.

The MnCO₃ so made was tested for the following alkaline materials which were found to be present as follows: NaHCO₃, trace; NaOH and Na₂CO₃, none. A trace of NaCl was found. It was also analyzed for the impurities normally associated therewith when made by conventional processes, which were found in the amounts stated in Table I below:

TABLE I

| | |
|---|---|
| Al | <0.0028 |
| Ca | 0.090 |
| CO | 0.0084 |
| Cu | 0.0010 |
| Fe | 0.0020 |
| Mg | 0.024 |
| Ni | 0.0029 |
| Pb | <0.0029 |
| Si | <0.0006 |
| Sn | <0.0028 |
| V | <0.0013 |

Reference to the analytical results, as represented by the values set out in Table I shows that the MnCO₃ produced was not only of a high bulk density, but was also in a high state of purity.

It should be borne in mind that that part of the procedure of Example 1 which comprised drawing off excessive portions of the slurry, filtering it, and returning the thus collected MnCO₃ to the reaction vessel is merely an expedient for building up the solids relatively rapidly.

For purposes of comparison the following test run was made:

Aqueous solutions of $MnCl_2$ and $Na_2CO_3$ were admixed in a reaction vessel at about 20° C. The pH was 6.3. 754 grams of $MnCO_3$ product were formed which were separated, washed, dried, and analyzed. The product showed a contamination of .27% $Na_2CO_3$, and 1.85% $NaHCO_3$. The alkalinity was unsatisfactory. The bulk density was 15.8 grams per cubic inch.

690 grams of the product so made were admixed with

Example 4

$MnCO_3$ made according to Example 1 was employed to make $MnO_2$ by heating the $MnCO_3$ in air to form a dense, free-flowing $MnO_2$ powder. This air-oxidized product was then contacted with dilute sulfuric acid and heated to leach out any unconverted $MnCO_3$ and lower oxides of manganese. The leached product was washed, dried and used to form the cathode mix of a Leclanché "A" cell battery according to standard formulation. The battery so made was then subjected to a standard drain test in accordance with the standard testing procedure described in Military Specification S.C.L. 3175 of the United States Army Signal Corps. In that test, the electromotive force of the battery being tested is measured as a function of drain time. The same procedure was followed using $MnO_2$ prepared from a common commercial low bulk density $MnCO_3$ for comparative purposes. The results are shown in Table II.

TABLE II

| Source of MnCO₃ | Density of MnCO₃, gm./in.³ | Density of MnO₂ from MnCO₃ | Percent MnO² | Percent Mn | "A" cell cathode, wt. in gm. | Time in hrs. to 1.0 v. at 75 ma.¹ drain² | Time in hrs. to 1.13 v. at 7.5 ma.¹ drain³ | After 3 mos. storage time in hrs. to 1.13 v. at 7.5 ma.¹ drain³ |
|---|---|---|---|---|---|---|---|---|
| Example 1 | 24.5 | 20 | 91.8 | 59.4 | 9.8 | 6.6 | 167 | 159 |
| Commercial | 4.4 | 6.2 | 87.5 | 58.4 | 7.9 | .3 | 37 | 15 |

¹ ma. means milliamps.
² At a fixed resistance of 16.7 ohms.
³ At a fixed resistance of 167 ohms.

1250 milliliters of water and heated, accompanied by stirring, to 59° C. The pH value (which was 8.6 after heating) was adjusted by additional $MnCl_2$ solution to 6.35. The mixture was then cooled to room temperature and the $MnCO_3$ product, separated, washed, and dried. An alkalinity analysis was run and the product found to contain .25% $NaHCO_3$. The product had a bulk density of 13.5 grams per cubic inch.

The $MnCO_3$ during its formation according to the invention, grows dentritically, to a desirably high density material of relatively low surface area and high percent Mn, the latter indicating its purity. The $MnCO_3$ of the invention has a surface area of less than 5 square meters per gram and a Mn content of at least 44% after drying at 110° C. The $MnCO_3$ made according to Example 1 had a surface area of less than 0.3 square meter per gram as determined by the standard B.E.T. method employing the liquid nitrogen absorption principle. It was 44.4% after drying at 110° C.

Example 2

The procedure of Example 1 above was repeated except that the temperature was maintained at between 52° C. and 61° C., the pH value was held at between 6.8 and 6.9, and the run was continued (being stirred and recycled) for only 50 minutes before the $MnCO_3$ being formed showed a total alkalinity, calculated as $NaHCO_3$, to be 0.2, and portions of the slurry were not drawn off, filtered, and the $MnCO_3$ on the filter returned to the reaction vessel. This is barely acceptable and shows the advantage of operating at a slightly lower pH and a higher temperature, and for a longer time, as in Example 1.

Example 3

The procedure of Example 2 was repeated except that the temperature was held at between 52 and 58° C., the pH value between 6.6 and 7.0, and the run continued (being stirred and recycled) for 1 hour and 30 minutes. The total alkalinity of the $MnCO_3$ product, calculated as $NaHCO_3$, was 0.0590. This shows that a longer reaction time than that of Example 2 gives a better product.

Example 4 shows a significant advantage of employing high density, high purity $MnCO_3$ according to the invention to make $MnO_2$ for dry cells over currently available $MnO_2$ (made from $MnCO_3$ made according to conventional practice).

Having described our invention, what we claim and desire to protect by Letters Patent is:

1. The method of making high density $MnCO_3$ of high purity which comprises admixing an aqueous solution of a water-soluble manganous salt with a water-soluble carbonate in amounts of each to provide and maintain a molar excess of the Mn fraction of the manganous salt over the $CO_3$ fraction of the carbonate at a pH value of between 5.7 and 7.2, under stirred conditions, at a temperature of between about 55° C. and the boiling temperature of the admixture to produce $MnCO_3$ in suspension to make a slurry; maintaining the $MnCO_3$ in suspension until the particle size and concentration of the suspended $MnCO_3$ in slurry are such as to insure a bulk density of the $MnCO_3$ of at least 15 grams per cubic inch; and separating the $MnCO_3$ so made.

2. The method according to claim 1 wherein the temperature of the reaction mixture is maintained between about 75° C. and about 95° C.

3. The method according to claim 1 wherein the molar ratio of Mn to $CO_3$ provided by the manganous salt and carbonate in the reaction mixture is more than 1 but not more than about 1.05.

4. The method acording to claim 1 wherein the pH value is maintained between about 6.0 and about 6.9.

5. The method according to claim 1 wherein the $MnCO_3$ being produced is maintained in suspension until a bulk density thereof of at least 20 grams per cubic inch is assured.

6. The method according to claim 1 wherein individual streams of aqueous solutions of the manganous salt and the carbonate are metered; a portion of the slurry is drawn off from the lower part of the reaction mixture and returned to the upper part thereof; the pH value of the thus recycled slurry is continuously measured; an overflow of slurry is collected from the reaction mixture; overflow slurry so removed is passed through a filter whereby $MnCO_3$ is removed therefrom and replaced in the reaction mixture to increase the density thereof to at least about 80 grams per liter; and thereafter recovering $MnCO_3$ of acceptable quality in a continuous process from subsequently collected overflow from the reaction mixture.

References Cited by the Examiner

UNITED STATES PATENTS

| | | | |
|---|---|---|---|
| 1,889,021 | 11/1932 | Kobe | 23—61 |
| 3,011,867 | 12/1961 | Welsh | 23—61 |

OTHER REFERENCES

Mellor, "Comprehensive Treatise on Inorganic and Theoretical Chemistry," vol. 12, Longmans, Green and Company, New York, 1932, pages 433 and 434.

OSCAR R. VERTIZ, *Primary Examiner.*

BENJAMIN HENKIN, *Examiner.*

G. OZAKI, *Assistant Examiner.*